Oct. 6, 1925.

H. INGRAM 1,555,850

PRESSURE CONTROL SYSTEM FOR STERILIZING AND PROCESSING APPARATUS

Filed Sept. 21, 1923   3 Sheets-Sheet 1

INVENTOR:
HARRY INGRAM.
BY
Charles C. Gill
ATTORNEY.

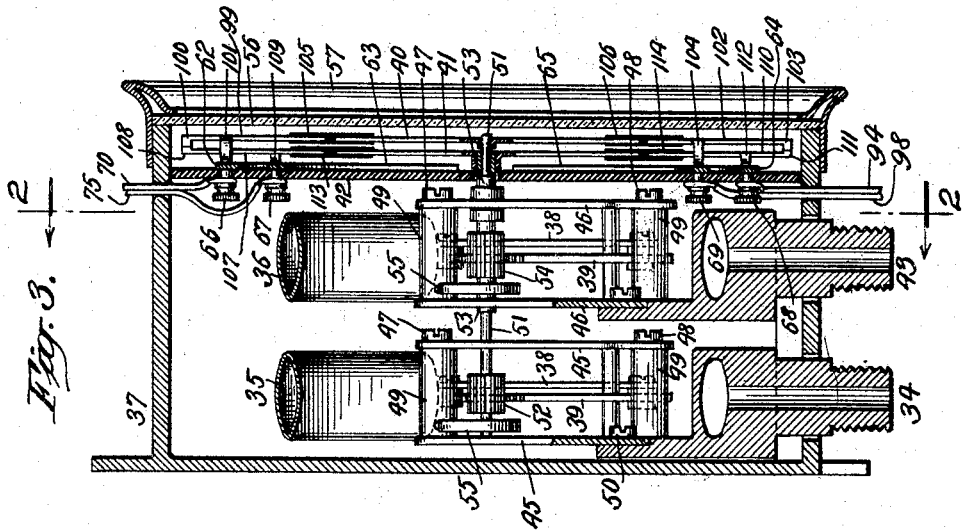

Oct. 6, 1925.
H. INGRAM
1,555,850
PRESSURE CONTROL SYSTEM FOR STERILIZING AND PROCESSING APPARATUS
Filed Sept. 21, 1923    3 Sheets-Sheet 3
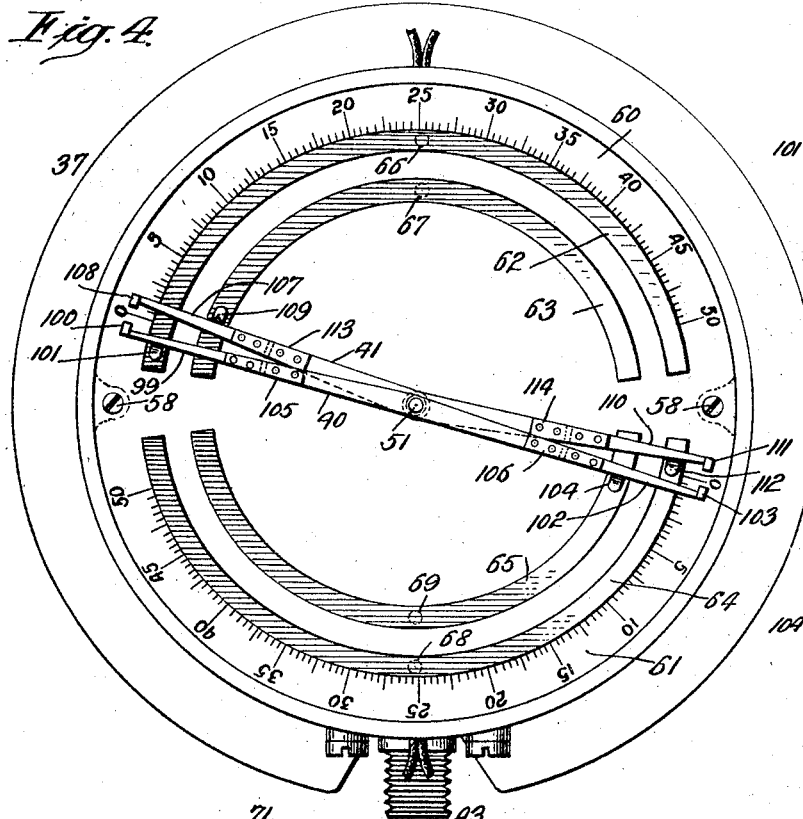
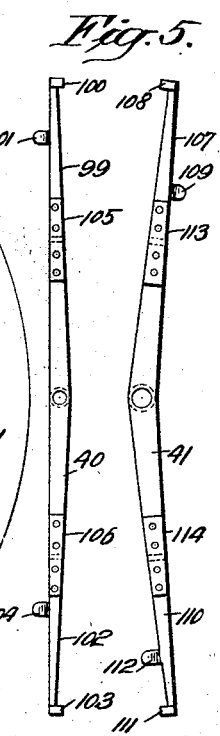
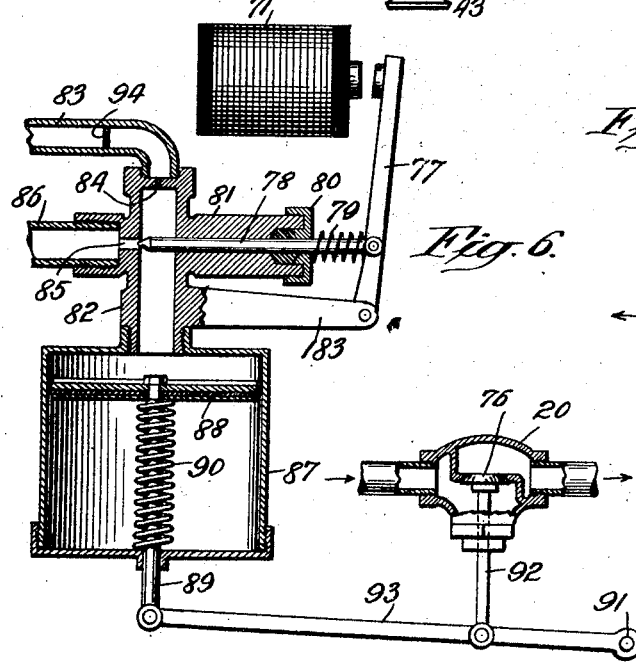
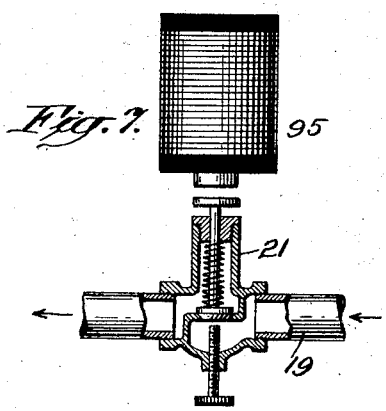
INVENTOR.
HARRY INGRAM.
BY
Charles C. Gill
ATTORNEY Patented Oct. 6, 1925.

1,555,850

UNITED STATES PATENT OFFICE.

HARRY INGRAM, OF BROOKLYN, NEW YORK.

PRESSURE-CONTROL SYSTEM FOR STERILIZING AND PROCESSING APPARATUS.

Application filed September 21, 1923. Serial No. 663,957.

*To all whom it may concern:*

Be it known that I, HARRY INGRAM, a citizen of the United States, and a resident of Brooklyn, in the county of Kings and State of New York, have invented certain new and useful Improvements in Pressure-Control Systems for Sterilizing and Processing Apparatus, of which the following is a specification.

The invention relates to apparatus for sterilizing or other heat processing food products and the like contained in closed receptacles, for example, tumblers, jars or the like, to which caps have been applied, preferably by vacuum sealing machines. In such processing operation the capped receptacles are submerged in water or other medium contained in a suitable tank or retort and subjected therein to the desired temperature ranging usually from 220 to 250 degrees Fahrenheit, and provision must be made to supply pressure to the processing tank or retort sufficient to overbalance the internal pressure generated within the receptacles, thereby to prevent such internal pressure from blowing off the caps.

My invention consists in combining in an apparatus for the purpose specified, a processing tank or retort and means for maintaining an adjustable pressure in the tank countering the internal pressure developed in the receptacles during the treatment thereof, such pressure in the tank increasing with the increase of temperature in the retort and the consequent increase of internal pressure within the receptacles and decreasing, at the end of the processing operation, with the decrease of temperature in the retort and resultant decrease of internal pressure in said receptacles. My apparatus involves a member responsive to ascending temperature variations in the tank or retort and adapted by its operation to admit from time to time an increase of external pressure into the retort in accordance with the requirements of the receptacles, and also a member which is responsive to the external pressure within the retort and acts to cut off the supply of such pressure when the proper amount thereof has entered the retort. The member which responds to the varying increasing temperatures in the retort also responds to the varying decreasing temperatures in the retort, as when the retort is being cooled, and then actuates mechanism by which on the decrease of such temperatures in the retort the external pressure in the retort is allowed to exhaust, the proportions or periods of said exhaust being regulated by the necessities of the receptacles being cooled and automatically controlled by the aforesaid member which is responsive to the external pressure within the retort.

I preferably make use, in the apparatus of my invention, of two curved Bourdon springs or tubes in one pressure gauge casing having a special dial and two special two-ended make-and-break switch-hands traversing opposite portions of the face of said dial and operable respectively from said springs, and with one of said springs I associate thermostatic means whereby the spring becomes responsive to variations of temperature in the retort, while with the other of said springs I associate means whereby said spring becomes responsive to external pressure conditions within the retort and acts to cut off the supply of such pressure when the requisite degree of pressure is within the retort and also acts to cut off the exhaust of such pressure from the retort at such stages during the final cooling of the retort, as may be requisite and proportioned to the temperature of the retort and the requirements of the receptacles therein. The spring which is responsive to temperature-changes in the retort acts to admit external pressure to and open the exhaust therefor from the retort and is controlled as to the extent of such admission and exhaust by the spring which responds to the external pressure conditions in the retort. The Bourdon springs cooperate with each other and with the aforesaid hands and dial to make and break electric circuits which include means for admitting external pressure to and cutting the same off from the retort and also means for exhausting pressure from the retort, the entire system operating automatically at proper stages and subject to the requirements of the retort and the receptacles under treatment therein.

The invention will be fully understood from the detailed description hereinafter presented, reference being had to the accompanying drawings, in which:

Fig. 1 is a diagrammatic view, partly in section and partly broken away, of a processing apparatus equipped with pressure control features embodying by invention;

Fig. 2 is a vertical transverse section, on a larger scale, through a gauge and switch mechanism forming a portion of my invention, the section being on the dotted line 2—2 of Fig. 3, this gauge being of duplex character and controlling the operation of certain valves for respectively admitting pressure to the top of the retort in accordance with increasing temperature changes therein and exhausting such pressure from the retort when there is a surplus thereof, as when the contents of the retort are being cooled at the end of the processing operation;

Fig. 3 is a central vertical section through the same taken on the dotted line 3—3 of Fig. 2;

Fig. 4 is a front elevation of the same;

Fig. 5 is a detached face view of the two indicating and switch-hands employed on the dial of the gauge shown in Figs. 2, 3 and 4;

Fig. 6 is a detail view, partly in section, of the valve means for admitting compressed air to the retort in accordance with increasing temperature-changes therein and the varying requirements of the packages under processing treatment, and Fig. 7 is a detail of the valve for exhausting pressure from the retort on decreasing temperature changes therein.

Figure 1:
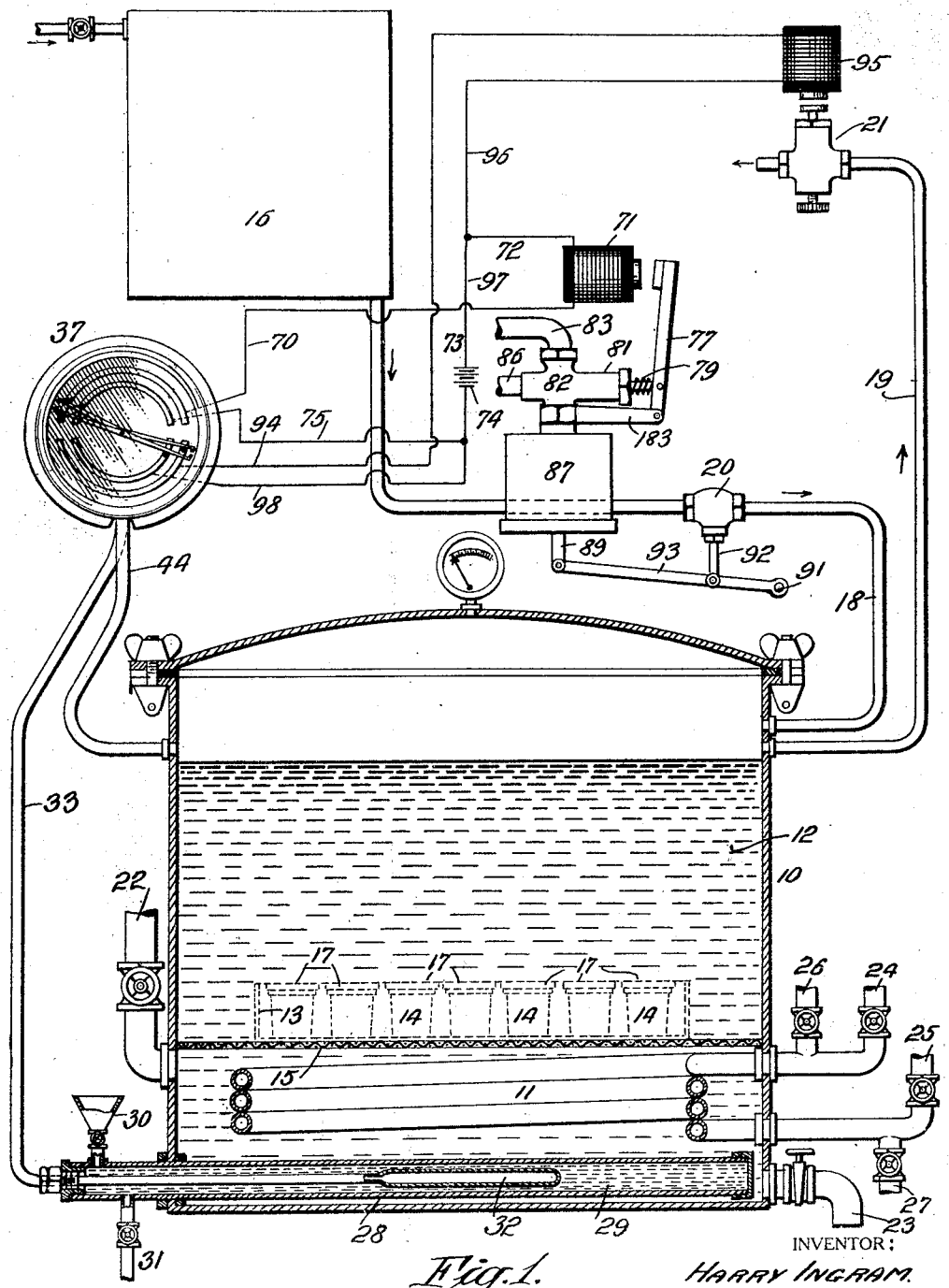

In the drawings, 10 designates a sterilizing or processing tank or retort of ordinary type, 11 a steam coil therein for properly heating the water 12, and 13 a basket of jars or tumblers 14 submerged within the water 12 and resting upon a screen or perforated plate 15, the features thus far identified being of any usual or suitable type.

16 designates a compressed air tank with the use of which suitable pressure is introduced into the upper end of the tank 10 for exerting the proper pressure on the caps 17 of the tumblers or containers 14 for preventing the internal pressure generated within the tumblers or containers during the sterilizing or processing operations, from blowing off the caps 17. I connect the tank 16 with the tank 10 by means of a supply-pipe 18, and from the upper end of the tank 10 I lead a blow-off pipe 19, said pipes being respectively equipped with valves 20, 21 to control the passage through them.

The tank 10 is equipped with a supply pipe 22 for water and with an outlet drain 23. The steam coil 11 is employed for heating the water 12 within the tank 10, and after the processing operation has continued a sufficient length of time said coil 11 may be used for circulating cold water therein for cooling the water 12. The coil 11 has valved inlet and outlet connections 24, 25, respectively, for the steam and valved inlet and outlet connections 26, 27, respectively, for use when cold water is to be circulated through the coil 11.

Within the retort 10 I arrange a tubular temperature tank 28 affording a chamber 29 for liquid and which tank 28 is preferably sealed at both ends, but may be open to the interior of the retort 10 if preferred. The tank 28 is equipped with means, as a funnel 30, through which the tank may be filled with a liquid, and it is also provided with a drain 31. The tank 28 is preferably a simple tube projected through the side of the retort 10 and closed at both ends, and the liquid within said tank 28 is subject to the temperature within the retort 10 and will reflect such changes of temperature as may from time to time take place within said retort. The tank 28 is employed, in connection with other features of the apparatus, as a governor or controller for automatically and thermostatically regulating the pressure within the tank 10 so that at all times said pressure shall preponderate to the extent of two or three pounds, for example, over the pressure generated by the processing operation within the tumblers 14.

Within the tank 28 is confined the bulb 32 of a thermostatic tube 33 whose upper end is connected with a nozzle 34 supporting and in communication with a Bourdon spring 35 which constitutes a continuation of the tube 33, said Bourdon spring 35 and tube 33 with its bulb 32 being filled with mercury or other suitable expansible material, so that the bulb 32, tube 33 and Bourdon spring 35 becomes a thermostatic tube. In my apparatus I make use of two Bourdon springs 35, 36 and they are preferably mounted within a single dial-casing 37 and are alike and of the form more clearly shown in Fig. 2 and connected at their outer ends by adjustable links 38 with sectors 39 which, by means of suitable pinions are caused to rotate shafts on which the hands 40, 41 are, respectively, mounted, whereby said hands are given their proper movements over the face of a dial 42, said hands and dial being novel. The Bourdon spring 36 is supported by and in communication with a nozzle 43 which corresponds with the companion nozzle 34 and is in communication through a pipe 44 with the main pressure chamber of the retort 10. The nozzle 34 supports two parallel vertical plates 45, and the nozzle 43 supports two corresponding parallel vertical plates 46, which are connected together at their upper and lower portions by screws 47, 48 on which are spacing bushings 49. The back plate 46 is secured by screws 49 to a flange of the nozzle 43, and the back-plate 45 is likewise secured by screws 50 to a flange of the nozzle 34. The plates 45 in their upper portions afford bearings for a rotary shaft 51 on which is secured a pinion 52 meshing with the sector 39 of the bourdon 35, and the plates 46 in their upper portions afford bearings for a tubular rotary shaft 53 on which is secured a pinion 54 meshing with the sector 39 of the bourdon 36. The shafts 51, 53 are each equipped with a usual resistance spring 55 common to pressure gauges. The shaft 51 extends freely through the tubular shaft 53 and both shafts extend through the center of the dial 42. The shaft 51 has secured on its outer end the hand and switch 40, which, for convenience, I may designate as the temperature hand because said hand is actuated by temperature changes in the retort 10. The shaft 53 has secured on its outer end the hand and switch 41, which I may designate for convenience, as the pressure hand, since said hand is responsive to changes of pressure in the retort 10. The dial 42 and hands 40, 41 are protected by a front glass disk 56 held in place by a removable ring frame 57 of usual character. The dial 42 may be secured within the casing 37 by means of screws 58 (Fig. 4) which enter lugs 59 formed on the walls of the casing 37 (Fig. 2).

The dial 42 and hands 40, 41 are of special construction and perform special duties not usual to pressure gauges. The dial 42 is a disk of insulating or non-conducting material and on the upper half of its face bears a scale 60 of pounds pressure ranging, in this instance, from "0" to "50" and reading from left to right, while on the lower half of its face said dial 42 bears a scale 61 of pounds pressure ranging in this instance, from "0" to "50" and reading from right to left. The dial 42 has secured upon the upper half of its face two spaced apart concentric conducting segments 62, 63, respectively, and upon the lower half of its face two spaced apart concentric conducting segments 64, 65, respectively, as shown in Fig. 4. Binding posts 66, 67 carried by the dial 42 electrically engage, respectively, the conducting segments 62, 63, and binding posts 68, 69 carried by the dial electrically engage, respectively, the conducting segments 64, 65. From the binding post 66 extends a conductor 70 (Fig. 1) to the electro-magnet 71, whence there is a circuit-return to the binding post 67 through the conductor 72, conductor 73, battery 74 and conductor 75. When a circuit is completed by electrically connecting the segments 62, 63 the magnet 71 becomes energized and effects the opening of the valve 20 (Fig. 6) to permit fluid pressure to pass from the tank 16 through the pipe 18 into the upper part of the retort 10, and when the circuit is broken by disconnection between the segments 62, 63 the magnet becomes deenergized and the disk 76 of valve 20 will close and cut off the passage through the pipe 18.

The electro-magnet 71 cooperates with a pivoted armature 77, to which is connected a rod-valve 78 which normally stands in open position shown in Fig. 6, this being due to the pressure of the spring 79 interposed on the outer end of said valve between the armature 77 and cap 80. The valve 78 is in the shape of a comparatively slender rod extending through a bearing 81 formed on one side of a tubular casing 82 from which, by means of an arm 183, the armature 77 is pivotally supported. The casing 82 has an inlet pipe 83 for water under pressure leading into the upper end thereof, and said casing, at the discharge of said inlet pipe 83 has a small opening 84 which admits the water into the interior of the casing 82. One side of the casing 82 is formed with a by-pass aperture 85 opening into a suitable drain-pipe 86. The pipe 83 may be connected with a pipe running through a building from the ordinary city water-main. When the valve 78 is in its open position shown in Fig. 6, the water passing through the aperture 84 will by-pass through the opening 85 and perform no operation. When the magnet 71 attracts the armature 77, the valve 78 is pushed inwardly against and closes the aperture 85, and at that time the water entering the casing through the aperture 84 becomes effective to open the valve 20. Secured to the lower end of the casing 82 is a cylinder 87 containing a movable piston 88 mounted on a rod 89 on which is a spring 90 adapted to normally hold the piston 88 in its upper position shown in Fig. 6. The rod 89 is pivoted to a link 93 which is pivotally secured at 91 and has pivotally secured to it a valve-rod 92 carrying at its upper end the valve disk 76. When the spring 90 acts to press the piston 88 to its upper position the rod 89 pulls upwardly on one end of the link 90 and thereby through the rod 92 presses the valve disk 76 against its seat. When additional pressure is required for the retort the circuit is made through the hands 40, 41 and magnet 71 and said magnet, becoming energized, attracts the armature 77 to it, and the result of this action is that the rod-valve 78 is moved against and closes the outlet aperture 85, and at this time the water under pressure entering the casing 82 through the aperture 84 and pipe 83 acts against the upper side of the piston 88 and depresses said piston, compressing the spring 90 and turning the link 93 downwardly and opening the valve 20, under which condition pressure may flow from the tank 16 into the retort 10, this supply of pressure being cut off on the deenergizing of the magnet 71 by the breaking, at the hands 40, 41, of the circuit through said magnet 71 when the requisite amount of pressure has entered the retort. I interpose in the pipe 83 a screen 94 to arrest any small particles of foreign matter which may be carried in the water flowing through said pipe 83.

From the binding post 68 extends a conductor 94 to an electro-magnet 95, whence there is a circuit-return to the binding post 69 through the conductor 96, conductor 97, battery 74 and conductor 98. When a circuit is completed by electrically connecting the segments 64, 65 the magnet 95 becomes energized and opens the valve 21 to permit excess or surplus pressure within the retort 10 to exhaust or blow off through the pipe 19, and when the circuit is broken by disconnection between the segments 64, 65 the magnet 95 becomes deenergized and the valve 21 closes and cuts off the passage through the pipe 19. The valve 21 is shown in detail in Fig. 7.

The means I provide for completing the circuit through the segments 62, 63, and magnet 71, or through the segments 64, 65 and magnet 95 are the hands 40, 41, respectively, and they make and break the respective circuits while traveling over the dial 42 under the control of the bourdons 35, 36 in accordance with the varying pressure requirements of the retort 10.

The hand 40 has at one end a conducting member 99 having laterally projecting lips 100, 101, the latter of which is always in electrical engagement with the segment 62, and has at its other end a conducting member 102 provided with laterally projecting lips 103, 104, the latter of which is always in electrical engagement with the segment 65. The member 99 of the hand 40 crosses over the segments 62, 63 without engaging the segment 63, and said member 99 is spaced and therefore insulated from the body of the hand 40 but is connected therewith by non-conducting material 105. The member 102 of the hand 40 crosses over the segments 64, 65 without engaging the segment 64, and said member 102 is spaced and therefore insulated from the body of the hand 40 but connected therewith by non-conducting material 106. One longitudinal edge of the hand 40 is straight and the opposite edge of the hand is on diverging lines from the center of the hand to the outer ends thereof.

The hand 41 has at one end a conducting member 107 provided with laterally projecting lips 108, 109, the latter of which is always in electrical engagement with the segment 63, and said hand has at its other end a conducting member 110 formed with laterally projecting lips 111, 112, the latter of which is always in electrical engagement with the segment 64. The member 107 of the hand 41 crosses over the segments 62, 63 without engaging the segment 62, and said member 107 is spaced and therefore insulated from the body of the hand 41 but is connected therewith by non-conducting material 113. The member 110 of the hand 41 crosses over the segments 64, 65 without engaging the segment 65, and said member 110 is spaced and therefore insulated from the body of the hand 41 but is connected therewith by non-conducting material 114. The hand 41 diverges outwardly from its center toward its ends and also from the oppositely diverging edges of the hand 40, and due to this construction the hands 40, 41 at both ends may normally lie spaced apart, as shown in Fig. 4, and also be conveniently operated at their end portions in the manner hereinafter described in connection with a single dial and a single casing 37 enclosing both bourdons 35, 36 and their cooperative mechanisms. The invention is not, however, limited in every instance to the employment of the shape or formation of the switch hands 40, 41, since I am aware that said hands may be variously modified without impairing their capability to perform their functions.

In the employment of the apparatus hereinbefore described, the capped receptacles 14 while submerged in the water in the retort 10 are subjected to the temperature desired for processing their contents, this temperature usually ranging from 220 degrees to 250 degrees F. The pressure generated within the receptacles 14 during the processing operation, necessitates the presence of external pressure within the retort to prevent the blowing off of the caps 17 by the internal pressure, and this external pressure is automatically supplied from the tank 16 in proportion as such pressure is required, it being desirable that the external pressure shall preponderate over the internal pressure of the receptacles but not be such as would tend to drive the caps into the receptacles or do other damage. An increase of temperature in the retort necessitates an increase in external pressure in the retort, and this increase of external pressure is brought about by utilizing the increase of temperature to produce an increase of pressure in the bourdon 35 and therefrom to effect the opening of the valve 20 admitting pressure from the tank 16 to the top of the retort. When the pressure in the retort should be lowered the valve 21 is automatically opened to allow the surplus pressure to blow off.

During the processing operation the heat of the water 12 is communicated to the fluid in the tank or vessel 28 and bulb 32, and the expansion of the fluid in said bulb and adjacent portions of the tube 33 acts upwardly through said tube and through the curved member or Bourdon spring 35, with the result that as the temperature in the retort increases the pressure within the spring 35 becomes greater and greater until at the proper period or periods the bourdon 35 will, through its sector 39 and the pinion 52, rotate the shaft 51 to turn the hand 40 forwardly along the scale 60 and segment 62 until the contact lug or lip 100 on said hand engages the contact lug or lip 108 on the adjacent end of the hand 41. This engagement of the contacts 100, 108 completes the circuit from the binding post 66 through the magnet 71 and back to the binding post 67 hereinbefore described, such engagement serving, through the members 99, 107 of said hands, to electrically connect the segments 62, 63 which are in engagement with said binding posts. The circuit is thus completed by the contact 100 moving to the contact 108 with the resultant electrical connection of the segments 62, 63. When the contact 100 moves to the contact 108, the hand 40 carries its contact 103 to a greater distance from the contact 111 of the hand 41. When the circuit is completed through the magnet 71 by the engagement of the contact 100 with the contact 108, said magnet, becoming energized, opens the valve 20, in the manner hereinbefore described, and allows the requisite amount of external pressure to pass through the pipe 18 and into the retort, and when the proper degree of external pressure has entered the retort in accordance with the temperature requirements thereof, such pressure acting through the pipe 44 and against the Bourdon spring 36, causes said bourdon, through its sector 39 to impart rotary movement to the pinion 54, shaft 53 and hand 41, with the result that the hand 41 carries its contact 108 from the contact 100 and breaks the circuit through the magnet 71, which then allows the valve 20 to close the pipe 18 and cut off the flow of pressure to the retort 10. The movement of the hand 41 just described carrying its contact 108 from the contact 100 of the hand 40, also results in the contact 111 being moved toward but not against the contact 103 of the hand 40. The hands 40, 41 are then in about the relation to each other shown in Fig. 4, but the left hand ends of said hands, looking at Fig. 4, will have advanced up the scale 60 and the other ends of said hands will have correspondingly advanced toward the left along the scale 61. Should there then be an increase of temperature in the retort 10 and consequently an increase of pressure in the receptacles 14, this increase of temperature will again act through the vessel 28, bulb 32, tube 33 and bourdon 35 to effect the opening of the valve 20 so that additional pressure will pass from the tank 16 through the pipe 18 to the retort 10, and on said further increase of temperature in the retort 10 requiring the additional external pressure within said retort, the bourdon 35 acts as it did before to turn the hand 40 to carry the contact 100 against the contact 108, thus completing the circuit through the segments 62, 63 and energizing the magnet 71 for opening the valve 20. When the contact 100 moves to the contact 108 as just stated, the contact 103 moves further away from the contact 111. After the requisite pressure has entered the retort 10, such pressure acting through the bourdon 36 will turn the hand 41 another step along the segments 62, 63 and 64, 65, with the result that the contact 108 is carried from the contact 100 and the circuit through the magnet 71 is broken, whereupon the valve 20 will close and no further pressure from the tank 16 will flow to the retort 10. The movement of the hand 41 under the influence of the bourdon 36 as just mentioned, while carrying the contact 108 in a direction from the contact 100 to break the circuit, carries its contact 111 toward the contact 103 of the hand 40, thus reestablishing the relation of said hands, 40, 41 to each other, although said hands had been advanced upwardly toward the right on the segments 62, 63 and downwardly toward the left along the segments 64, 65. The same operation as I have just described will be repeated with every material increase of temperature in the retort 10 requiring additional external pressure to be delivered to said retort for preventing the blowing off of the caps 17. The operation of controlling the external pressure within the retort 10 with relation to the temperature in said retort and in the receptacles 14 is carried on automatically and efficiently.

After the processing operation has continued the proper length of time, the temperature in the retort 10 must be gradually reduced, and this reduction may be effected by any suitable method, as by circulating cold water through the coils 11. As the temperature reduces within the retort 10, the pressure within the receptacles 14 also reduces or becomes less, and consequently the external pressure within the retort acting against the caps 17 should also be reduced, and this graduation in the reduction of the internal pressure of the receptacles 14 and external pressure within the retort 10 is automatically taken care of by the apparatus hereinbefore described. A lessening of the temperature in the retort 10 and bulb 32 reduces the pressure in the tube 33 leading to the bourdon 35 and with each reduction of temperature and of said pressure, the hands 40, 41 act reversely to their operation hereinbefore described and by step by step movements return to their initial position and relation to each other shown in Fig. 4. At this time however the contacts 100, 108 do not come together, and hence do not form any circuit between the segments 62, 63, but the hands 40, 41 at their left hand ends, looking at Fig. 4, make the necessary circuits through the segments 64, 65 to energize the magnet 95 for opening the valve 21, said valve opening to release the external pressure from the retort 10 with each decrease of temperature within said retort. During the cooling of the retort 10, the lessening of the pressure in the bulb 32 due to the reduction of temperature in the retort 10, results in the bourdon 35, while regaining its normal or initial condition, operating through its sector 39 to turn the hand 40 reversely to its former operation, carrying the contact 103 into engagement with the contact 111 and the contact 100 further away from the contact 108. When the contacts 103, 111 are in electrical connection, the circuit is formed through the conducting members 102, 110 of the hands 40, 41 and through the segments 64, 65 to energize the magnet 95. When the external pressure within the retort 10 has been sufficiently exhausted through the pipe 19, the bourdon 26 will, acting through its sector 39, move the hand 41 to carry its contact 111 from the contact 103 of the hand 40, thereby breaking the circuit through the magnet 95 and allowing the valve 21 to close. The movement of the hand 41 to carry the contact 111 away from the contact 102 causes the contact 108 to approach the contact 100, leaving the hands 40, 41 in about the relation to each other in which they are shown in Fig. 4. With each decrease of temperature in the retort 10 and consequent reduction of pressure in the bulb 32, the bourdon 35 acts to move the hand 40 to carry its contact 103 against the contact 111 of the hand 41, thus establishing the circuit through the magnet 95 and opening the valve 21 to permit excess external pressure within the retort 10 to escape, and upon this reduction of external pressure within the retort 10, the bourdon 36, regaining its normal condition, acts to turn the hand 41 so as to carry its contact 111 from the contact 103 of the hand 40, thereby breaking the circuit through the magnet 95 and allowing the valve 21 to close.

It will thus be seen that in the use of my apparatus hereinbefore described, with each increase of temperature within the retort 10 and receptacles 14, external pressure is admitted in the proportion of such increase to the upper portion of the retort 10 for preventing the blowing off of the caps 17, the amount of such external pressure thus introduced into said retort being proportioned to the necessities of the receptacles 14, so that the external pressure on the caps 17 is somewhat greater than the internal pressure within said receptacles against the caps.

During the cooling of the retort and receptacles 14 after the processing operation has been concluded, the external pressure within the retort is automatically exhausted in proportion to the reduction of temperature in said retort and the consequent reduction of pressure within the receptacles 14.

I have described the heating of the water 12 in the retort 10 by means of the coil 11, but the invention is not limited to the use of the coil 11 for heating the water, since it is not unusual to inject steam into the water for heating the same.

I have combined the electric switch mechanisms and the pressure controlling mechanisms both for the increasing of external retort pressure and the reduction of such pressure, within the one pressure gauge casing 37, and I regard this construction and arrangement as very desirable on account of its compactness and for other apparent reasons, but I do not wish to limit my invention to the combining of all these features of novelty in one casing 37, since the same final results may be obtained in modified arrangements pertaining to the pressure gauge casing, as, for instance, I might employ two of such casings, one containing the bourdon 35 and the other the bourdon 36.

I regard the employment of the bulb 32, tube 33 and Bourdon spring 35, the whole constituting a thermostatic bourdon, as an essential feature of my invention, since thereby I am enabled to secure an accurate response to increasing and decreasing temperatures in the retort 10 and to do so at a reasonable distance from the retort and without the use of complex mechanisms. The bulb 32 is protected by the auxiliary receptacle or tank 28 which I have shown as closed from the interior of the retort 10, but said receptacle may if desired be perforated and thus be supplied with water from the retort 10 in lieu of being separately supplied therewith through the funnel 30. The bulb 32 is sensitive to temperature changes in the retort 10 and with its use a safe preponderance of pressure in the retort over the internal pressure of the tumblers may always be readily secured and maintained.

I have found the mechanism described for operating the valve 20 to be very desirable. The water pressure in an ordinary water supply pipe acting against the piston 88 secures a quick response in the valve 20, and this pressure when the rod-valve 78 is open so as to leave the by-pass aperture 85 open, is insufficient to move the piston 88, but when the rod-valve 78 is moved to close the by-pass the pressure of the water on the piston 88, which is of considerable area and always has a limited pressure on it, causes said piston to act promptly and open the valve 20. When the by-pass 85 is opened, the spring 90 moves the piston 88 upwardly and quickly closes the valve 20. The link 93 is of some length and acts on the valve-rod 92 to open or close the valve 20 with only limited movement of the piston 88. In lieu of connecting the pipe 83 with a source of water supply under pressure, said pipe may be connected with a source of compressed air supply as, for instance, with the tank 16, the air performing the same function as the water.

What I claim as my invention and desire to secure by Letters Patent, is:

1. In apparatus of the character described comprising means for supplying fluid pressure to the retort to act externally against the caps to counter the internal pressure generated within the receptacles, thermostatic pressure gauge mechanism comprising a system entirely filled with liquid and having a Bourdon tube at one end and exposed at the other end to retort temperatures.

2. Apparatus as claimed in claim 1, in which said thermostatic pressure gauge mechanism is also responsive to reducing temperatures in the retort, as during the cooling of the receptacles, for exhausting external pressure from the retort in accordance therewith, and in which the pressure gauge mechanism is also responsive to reductions of pressure in the retort for cutting off said exhaust when the requisite amount of external pressure has escaped.

3. In apparatus of the character described, thermostatic pressure gauge mechanism comprising a system entirely filled with liquid responsive to temperature changes within the retort for admitting fluid pressure to the retort on increases of temperature therein and exhausting said pressure from the retort on decreases of temperature therein, said thermostatic mechanism comprising a Bourdon tube at one end exposed to retort temperatures and at its other end curved to form a Bourdon spring, and pressure gauge mechanism responsive to the external pressure within the retort and adapted to cut off the supply of such pressure when the requisite amount thereof has entered the retort, and, on the decreases of temperature in the retort cutting off said exhaust when the requisite amount of external pressure has escaped from the retort.

4. Apparatus as claimed in claim 1, in which the pressure gauge mechanism responsive to external pressure comprises a Bourdon spring into which the pressure extends.

5. Apparatus as claimed in claim 2, in which the pressure gauge mechanism responsive to external pressure comprises a Bourdon spring into which the pressure extends.

6. Apparatus as claimed in claim 3, in which the pressure gauge mechanism responsive to external pressure comprises a Bourdon spring into which the pressure extends.

7. Apparatus as claimed in claim 1, in which the Bourdon tube has a bulb on its lower end extending into the retort, and in which the pressure gauge mechanism responsive to external pressure comprises a Bourdon spring into which the pressure extends.

8. Apparatus as claimed in claim 1, in which the retort has a casing within its lower portion containing liquid and in which the lower end of the Bourdon tube has a bulb confined within said casing.

9. In apparatus of the character described, a thermostatic pressure gauge mechanism comprising a system entirely filled with liquid responsive to temperature changes in said retort and comprising a Bourdon tube whose upper end is curved to form a Bourdon spring and whose lower portion extends into a portion of the retort containing liquid and which tube contains a fluid substance to expand under increasing and contract under decreasing retort temperatures, said spring on its movements under increasing retort temperatures effecting the admission of increases of external pressure into the retort and on its movements under decreasing retort temperatures, effecting the exhaust of external pressure from the retort, and a pressure gauge mechanism connected with the retort and responsive to increasing and decreasing external pressure changes therein and adapted when the requisite external pressure has entered the retort to meet increases of retort temperature, to cut off the admission of such pressure and when under decreasing retort temperatures sufficient external pressure has exhausted to meet such condition, to cut off such exhaust.

10. In apparatus of the character described, means for supplying pressure to the retort and controlled by a valve, means for cutting off the supply of such pressure to the retort, and cooperative means governing such supply and cut off comprising a thermostatic pressure gauge mechanism comprising a system entirely filled with liquid, including having a tube exposed to the temperature of the retort and having a shaft rotatable therefrom and carrying a conducting temperature switch-hand, a pressure gauge apparatus responsive to pressure within the retort and having a shaft rotatable therefrom and carrying a conducting pressure switch-hand, two main conductors over which said hands travel, circuit conductors including means for opening said supply valve to admit pressure to the retort and respectively electrically connected with said main conductors, said temperature-hand electrically engaging one of said main conductors and said pressure-hand electrically engaging the other of said conductors and said hands normally being separated from each other at their outer conducting portions, said temperature-hand being operable by an increase of retort temperature to move against said pressure-hand and thereby complete the circuit across said main conductors to open said supply valve, and said pressure-hand being operable under retort pressure to leave said temperature-hand and thereby break the circuit and allow said valve to close.

11. Apparatus as claimed in claim 10, in which said hands are divergent to normally space their end portions apart and have contacts on their ends to engage each other for completing the circuit and respectively have contacts riding on said main conductors.

12. In apparatus of the character described, means for reducing the pressure in the retort proportionately to the reduction of temperature therein, comprising a blow-off valve connected with the retort, and cooperative means governing said valve comprising a thermostatic pressure gauge apparatus comprising a system entirely filled with liquid, including a Bourdon tube exposed to reducing temperature changes in said retort and having a shaft rotatable therefrom and carrying a conducting temperature switch-hand, a pressure gauge apparatus responsive to pressure within the retort and having a shaft rotatable therefrom and carrying a conducting pressure switch-hand, two main conductors over which said hands travel, circuit conductors including means for opening said valve to exhaust pressure from the retort and respectively electrically connected with said main conductors, said temperature-hand electrically engaging one of said main conductors and said pressure-hand electrically engaging the other of said conductors and said hands normally being separated from each other at their outer conducting portions, said temperature-hand being operable by a decrease of retort temperature to move against said pressure-hand and thereby complete the circuit across said main conductors to open said valve, and said pressure-hand being operable under reducing retort pressure to leave said temperature hand and thereby break the circuit and allow said valve to close.

13. Apparatus as claimed in claim 12, in which said hands are divergent to normally space their end portions apart and have contacts on their ends to engage each other for completing the circuit and respectively have contacts riding on said main conductors.

14. In apparatus of the character described, means for supplying pressure to the retort on increasing changes of temperature therein and controlled by a supply valve, means for cutting off the supply of such pressure, means for exhausting the pressure from the retort on decreasing temperature changes therein and embodying a blow-off valve, and means for cutting off said exhaust, said several means comprising two coacting pressure gauge apparatuses, one subject to temperature changes in the retort and comprising a Bourdon tube curved at the gauge end to form a spring and at its other end exposed to the temperature of the retort and said tube being entirely filled with liquid and the other responsive to retort-pressure and each having and being adapted to operate a rotary shaft, a temperature-hand on one of said shafts, a pressure-hand on the other shaft, said hands having oppositely extending members and being conductive in their outer end portions, said hands diverging from each other at their outer end portions, two main conductors over which adjacent end portions of said hands travel and with which they are respectively in electrical engagement, two main conductors over which the other adjacent end portions of said hands travel and with which they are respectively in electrical engagement, circuit conductors extending from said first two main conductors and including means for opening said supply valve and the circuit across said main conductors being closed when said temperature-hand thereat engages the pressure-hand thereat under increasing retort-temperature to open said supply valve and broken when the pressure-hand thereat leaves said temperature-hand thereat under retort pressure to allow said valve to close, and circuit conductors extending from said second two main conductors and including means for opening said blow-off valve and the circuit across said main conductors being closed when the temperature-hand thereat engages the pressure hand thereat under decreasing retort temperature to open said blow-off valve and broken when the pressure-hand thereat leaves said temperature hand thereat under decreasing retort pressure to allow said valve to close.

15. Apparatus as claimed in claim 14, in which said pressure gauge apparatuses are enclosed in a casing having a dial of non-conductive material and on opposite portions of which said two pairs of main conductors are in arcuate form secured, and in which the shaft of the tempearture gauge member extends freely through the shaft of the pressure gauge member, both shafts extending through said dial and carrying their respective hands at the face thereof.

16. Apparatus as claimed in claim 14, in which the responsive members of said pressure gauge apparatuses are curved tubular Bourdon springs and in which the shaft of one extends through the shaft of the other, and in which said hands are at their central portions secured on their respective shafts and insulated from their outer end conductive portions.

Signed at New York city, in the county of New York and State of New York, this 19th day of September, A. D. 1923.

HARRY INGRAM.